US008724505B2

(12) United States Patent
Ong

(10) Patent No.: US 8,724,505 B2
(45) Date of Patent: May 13, 2014

(54) FLEXIBLE MECHANISM FOR SUPPORTING VIRTUAL PRIVATE NETWORK SERVICES BASED ON SOURCE-INDEPENDENT DISTRIBUTED ADVERTISEMENTS

(75) Inventor: Lyndon Y. Ong, Sunnyvale, CA (US)

(73) Assignee: Ciena Corporation, Hanover, MD (US)

(*) Notice: Subject to any disclaimer, the term of this patent is extended or adjusted under 35 U.S.C. 154(b) by 561 days.

(21) Appl. No.: 11/514,546

(22) Filed: Sep. 1, 2006

(65) Prior Publication Data

US 2008/0056264 A1    Mar. 6, 2008

(51) Int. Cl.
*H04L 12/28* (2006.01)

(52) U.S. Cl.
USPC ............. 370/254; 370/351; 398/45; 398/54

(58) Field of Classification Search
USPC ......... 370/392, 400, 254, 235, 237, 351, 401, 370/241, 389, 231; 398/45, 51, 54, 58; 709/238, 242
See application file for complete search history.

(56) References Cited

U.S. PATENT DOCUMENTS

| | | | | |
|---|---|---|---|---|
| 6,205,488 | B1* | 3/2001 | Casey et al. ................... | 709/238 |
| 2004/0037296 | A1* | 2/2004 | Kim et al. ................. | 370/395.53 |
| 2004/0049597 | A1* | 3/2004 | Ould-Brahim ................ | 709/242 |
| 2004/0057439 | A1* | 3/2004 | Ould-Brahim ................ | 370/400 |
| 2004/0184441 | A1* | 9/2004 | Wu et al. ....................... | 370/351 |
| 2004/0202171 | A1* | 10/2004 | Hama ......................... | 370/395.1 |
| 2006/0002401 | A1* | 1/2006 | Mukherjee et al. ........... | 370/401 |
| 2006/0114916 | A1* | 6/2006 | Vasseur et al. ............... | 370/397 |

OTHER PUBLICATIONS

Tom Lehman, DRAGON Control Plane Architecture and Design, Jul. 31, 2006.*
D. Brungard, Ed., Network Working Group Request for Comments: 4258, Nov. 2005.*
Deborah Brungard, Network Working Group Request for Comments 4258, Oct. 2004.*

* cited by examiner

*Primary Examiner* — Dang Ton
*Assistant Examiner* — Mandish Randhawa
(74) *Attorney, Agent, or Firm* — Clements Bernard PLLC; Christopher L. Bernard; Lawrence A. Baratta, Jr.

(57) ABSTRACT

The present invention provides a mechanism for distributing client Virtual Private Network (VPN)-related information within a network using a source-independent distributed advertisement that includes incorporating client VPN-related information related to a node of a network into a source-independent distributed advertisement associated with a routing protocol, distributing the source-independent distributed advertisement from the node of the network to at least one other node of the network, or from another node of the network or a centralized management system to the at least one other node of the network, and updating other VPN-related information with the client VPN-related information related to the node of the network at the at least one other node of the network, wherein the client VPN-related information related to the node of the network is distributed to the at least one other node of the network without requiring the establishment of a Transmission Control Protocol (TCP) session specifically for the distribution of the client VPN-related information.

20 Claims, 11 Drawing Sheets

FLEXIBLE MECHANISM FOR SUPPORTING VIRTUAL PRIVATE NETWORK SERVICES BASED ON SOURCE-INDEPENDENT DISTRIBUTED ADVERTISEMENTS

FIELD OF THE INVENTION

The present invention relates generally to the networking field. More specifically, the present invention relates to a flexible mechanism for supporting Virtual Private Network (VPN) services based on source-independent distributed advertisements.

BACKGROUND OF THE INVENTION

VPNs are services whereby a network provider allows a customer to have some control over how their data is transmitted over a network, e.g. by retaining local control over their addressing scheme or by requesting transport to an associated remote location while letting the network provider devise the best method for transporting the data. Conventional VPNs are assumed to be provided using a fully distributed mechanism wherein each border node presents a customer interface and provides appropriate functions to the customer equipment.

One issue associated with VPNs is the discovery of other members of the same VPN and the restriction of calls or connections to the closed membership of that VPN. A number of mechanisms have been proposed for this, including the provisioning of this information, discovery using an exterior routing protocol, such as Border Gateway Protocol (BGP) or Interior Gateway Protocol (IGP), and discovery using RADIUS. These mechanisms are presented in various standards. The favored mechanism is discovery using BGP.

A basic model for VPN services is illustrated in FIG. 1. Referring to FIG. 1, there are two VPNs, each consisting of Customer Edge (CE) equipment 10,12 belonging to a customer, Provider Edge (PE) equipment 14 belonging to a service provider, and other Provider (P) equipment and infrastructure 16 belonging to the service provider. In the basic model for VPN services, CE equipment 10,12 belonging to a particular VPN, such as the VPN illustrated with "solid" lines or the VPN illustrated with "dashed" lines, exchange data as if a separate, private network connects them together, despite the fact that the two VPNs share the common network 18 of the service provider. If Layer 1 connections are used to connect the CE equipment 10,12, this is considered an L1 VPN; if Layer 2 connections are used to connect the CE equipment 10,12, this is considered an L2 VPN; if Layer 3 connections are used to connect the CE equipment 10,12, this is considered an L3 VPN; etc.

It is expected that the service provider ensures that the data exchanged via one VPN is not shared with the other VPN, i.e. that the two VPNs are isolated from one another. It is also expected that the addressing space used by one VPN is dedicated to that VPN, i.e. that that VPN has control over the allocation of addresses to the corresponding CE equipment 10,12, independent of the addressing space used by the common network 18 of the service provider. One important function of the common network 18 of the service provider is to support the necessary capabilities at the PE equipment 14 to ensure the isolation of the data exchanged and the understanding of the customers' addressing spaces, i.e. if CE1 wants to send data to CE2, the service provider's PE equipment 14 must understand where CE1 and CE2 are in the common network 18 and how to exchange the data between them.

A standard BGP-based model for VPN services, designed to work between peer entities, is illustrated in FIG. 2. Referring to FIG. 2, the BGP routing protocol is used between the PE equipment 14 to exchange information that is required to support the isolation and address mapping that is required for VPN services. This mechanism involves the establishment of BGP sessions between the PE equipment 14 and the exchange of VPN-related information. Specifically, each PE node 14 uses a BGP session associated with a particular VPN to pass a record of the Customer Port Identifier (CPI):Provider Port Identifier (PPI) mapping. BGP filtering is used to ensure that only information associated with the particular VPN is carried on the particular BGP session. As a result, each PE node 14 receives information about the ports used for the particular VPN and how these ports are associated with the CPIs. The customer can use their own CPI to request connection and data exchange between their CE equipment 10,12 within the particular VPN. Any changes in VPN membership or addressing space are reflected in subsequent exchanges of information over BGP sessions, such that the VPN information is kept up-to-date.

Individual BGP sessions are required between the PE equipment 14 belonging to a particular VPN, and multiple BGP sessions are required in order to support multiple VPNs associated with a particular PE node 14. The use of the BGP routing protocol and its associated processing overhead is required specifically for VPN support, and its use is not otherwise necessary.

An IGP advertisement-based model for VPN services is illustrated in FIGS. 3-5. Referring to FIGS. 3-5, a special VPN element is added to the normal routing protocol used in the common network 18 of the service provider (i.e. the IGP). The IGP is used for the routing of data between nodes within the common network 18, either consisting of connections in an L1 network or packet data in an L2 or L3 network. The IGP advertises a separate protocol element to carry data about the VPNs that are locally supported by the advertiser (i.e. the advertising router). This information is "flooded" in the normal process of interior routing to all PE nodes 14 and P nodes 16, and thus is distributed to all PE nodes 14. Again, updates are provided to keep the VPN information up-to-date concerning CE membership and addressing spaces.

The basic VPN advertisement includes a VPN identifier and a PE identifier, linking particular PE nodes 14 with a particular VPN. Presumably, information concerning the CE identifiers supported by a particular PE node 14 is added so that specific routing based on the CE identifiers can be supported.

The basic operation of the IGP advertisement-based model for VPN services is illustrated in FIGS. 3-5. Each PE node 14 generates VPN advertisements and "floods" these VPN advertisements to other P nodes 16 using the IGP procedures. Each PE node 14 then builds its membership and addressing tables using the received information. The VPN advertisements are a relatively new IGP requirement and are not supported by existing IGP routing protocols. Disadvantageously, they add additional advertisements to be carried by the routing protocols.

Disadvantageously, the models for VPN services described above require the implementation of another, complex routing protocol, BGP or IGP, which involves the establishment of individual Transmission Control Protocol (TCP) sessions between the endpoint nodes participating in the VPN. The impact of this is complexity—BGP and IGP are distinct routing protocols which each require a distinct routing protocol stack and trained maintenance staff; cost—again BGP and IGP are distinct routing protocols which each require a distinct routing protocol stack and additional development and testing resources; additional processing overhead—the distinct routing protocol stacks for BGP and IGP each have their own routing adjacency and keep-alive, and multiple TCP sessions are required, adding considerable overhead to the Central Processing Unit (CPU) processing load; and deployment difficulties—it can be difficult to deploy a VPN across a large network of switches due to the need to update the software of each switch with BGP or IGP, administer the establishment of TCP sessions, etc.

BRIEF SUMMARY OF THE INVENTION

In various exemplary embodiments, the present invention provides that the advertisement of VPN membership is done through source-independent distributed advertisements. Such advertisements may describe routing characteristics that are independent of the advertising node, i.e. characteristics of other nodes in the network. An example of using source-independent distributed advertisements for VPN is the use of extensions to the client reachability advertisement of the IGP routing protocol used in the domain. Client reachability advertisement, or Transport Network-Assigned Address (TNA) advertisement, is a relatively recent innovation that has been defined in the International Telecommunications Union (ITU-T) Automatically Switched Optical Network (ASON) standards as a method of advertising reachability to a particular client or set of clients. The defined reachability advertisement includes only the client address or TNA and the node that supports reachability to the client. Advantageously, the reachability advertisement is extended to include other information relevant to VPN membership, such as a VPN Identification (ID) associated with the client, client service class within the VPN, and whether the client is allowed to initiate or receive connections from outside of the VPN. By adding such information, VPN services are enabled in the network with a minimum of additional software upgrading and deployment.

It should be noted that the source-independent distributed advertisements of the present invention may carry information about any node in the network and, as a result, allow for the advertisement of VPN membership by either the node locally hosting the VPN client or by other nodes, in particular, by a centralized source of advertisements, such as a centralized VPN management system. Because these advertisements carry both the advertisement source (i.e. the advertising router) and the identity of the node hosting the VPN client (i.e. the node ID) as separate pieces of information, the receiving system may use the advertised information without regard to which node generated the advertisement. This provides flexibility for the network operator to use the same mechanism to support either central administration of VPN membership (which may be advantageous for security and/or administrative simplicity) or distributed administration of VPN membership (which may be advantageous for client-based VPN management and/or situations where VPN membership changes rapidly).

The present invention extends a simple existing mechanism for client reachability advertisement and provides a mechanism for offering sophisticated VPN services with minimal added complexity in the network control plane. No new routing protocols are required and no additional routing protocol traffic is generated beyond some additional information that must be carried in an existing client reachability advertisement.

In one exemplary embodiment of the present invention, a method for distributing client VPN-related information within a network using a source-independent distributed advertisement includes incorporating client VPN-related information related to a node of a network into a source-independent distributed advertisement associated with a routing protocol, distributing the source-independent distributed advertisement from one of the node of the network, another node of the network, and a central management system to at least one other node of the network, and updating other VPN-related information with the client VPN-related information related to the node of the network at the at least one other node of the network.

In another exemplary embodiment of the present invention, a system for distributing client VPN-related information within a network using a source-independent distributed advertisement includes a processor at one of a node of a network, another node of the network, and a central management system operable for incorporating client VPN-related information related to the node of the network into a source-independent distributed advertisement associated with a routing protocol, a network connection for distributing the source-independent distributed advertisement from one of the node of the network, the other node of the network, and the central management system to at least one other node of the network, and a processor at the at least one other node of the network for updating other VPN-related information with the client VPN-related information related to the node of the network at the at least one other node of the network.

In a further exemplary embodiment of the present invention, a method for distributing client VPN-related information within a network using a source-independent distributed advertisement includes incorporating client VPN-related information related to a node of a network into a source-independent distributed advertisement associated with a routing protocol, distributing the source-independent distributed advertisement from one of the node of the network, another node of the network, and a central management system to at least one other node of the network, and updating other VPN-related information with the client VPN-related information related to the node of the network at the at least one other node of the network, wherein updating the other VPN-related information with the client VPN-related information related to the node of the network at the at least one other node of the network includes updating one or more tables at the at least one other node of the network, and wherein the client VPN-related information related to the node of the network is distributed to the at least one other node of the network without requiring the establishment of a TCP session specifically for the distribution of the client VPN-related information.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
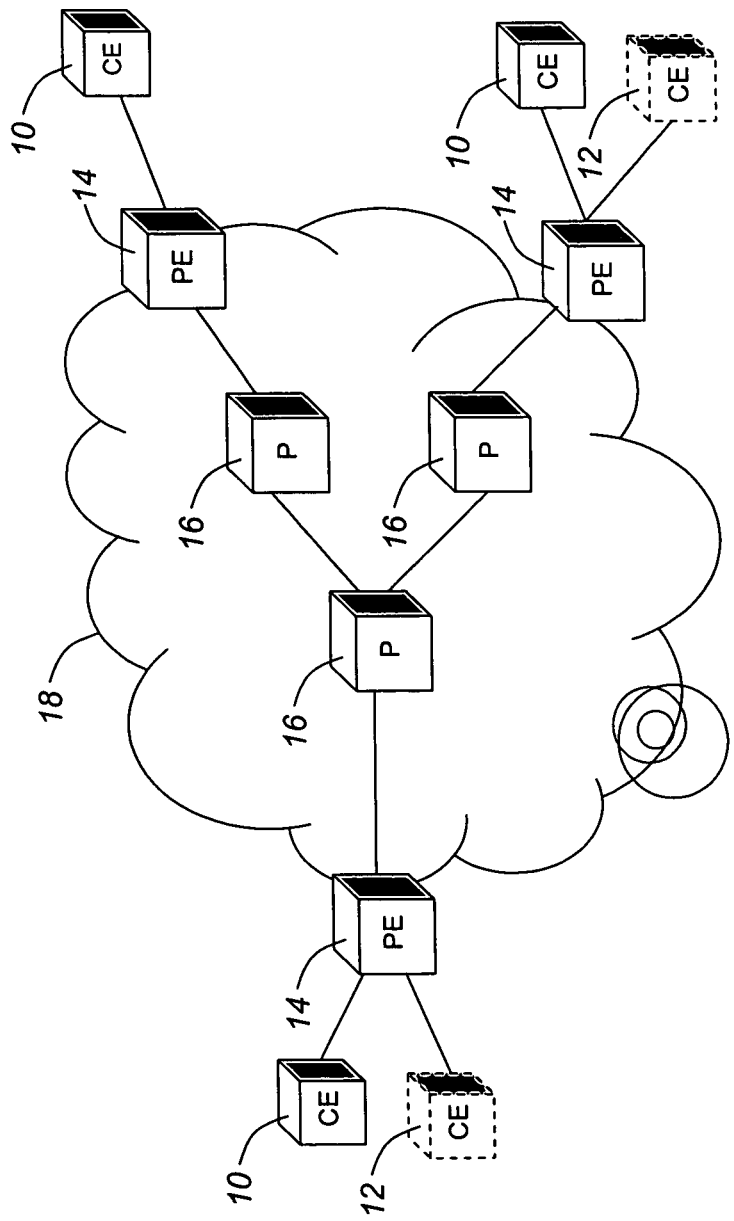
FIG. 1 is a schematic diagram illustrating a basic model for VPN services including two VPNs.
Figure 2:
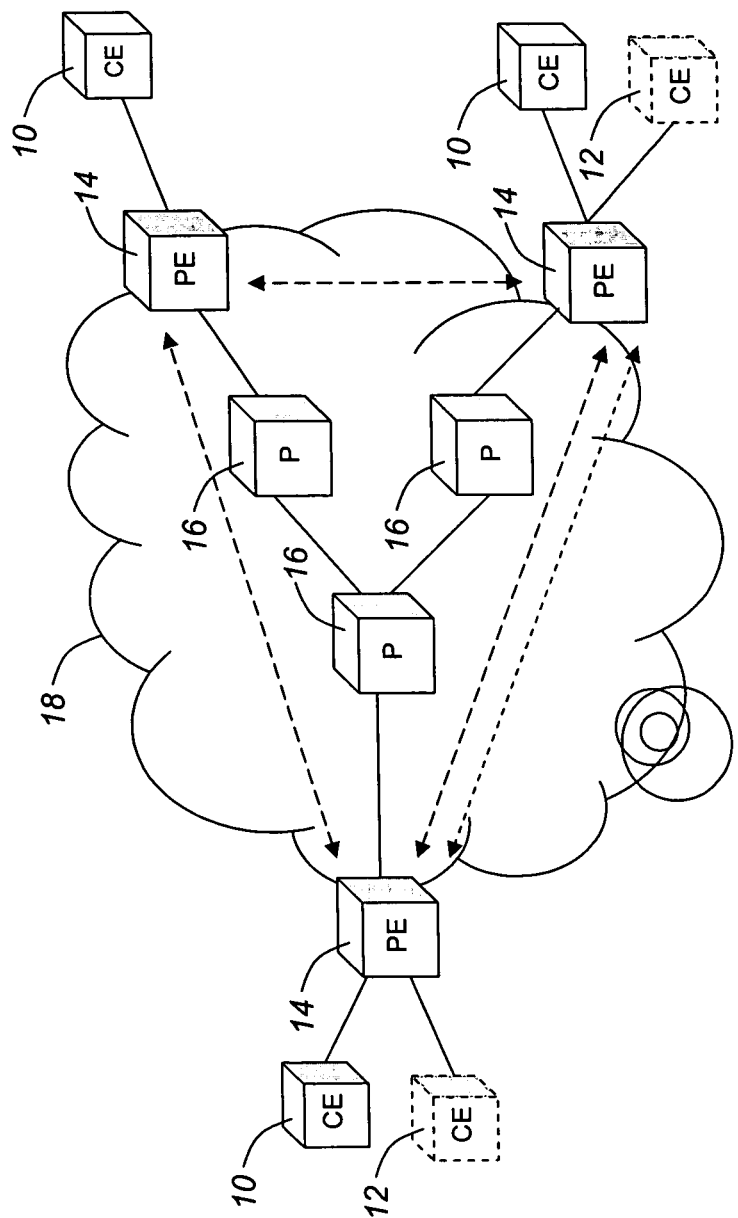
FIG. 2 is a schematic diagram illustrating a standard BGP-based model for VPN services including two VPNs.
Figure 3:
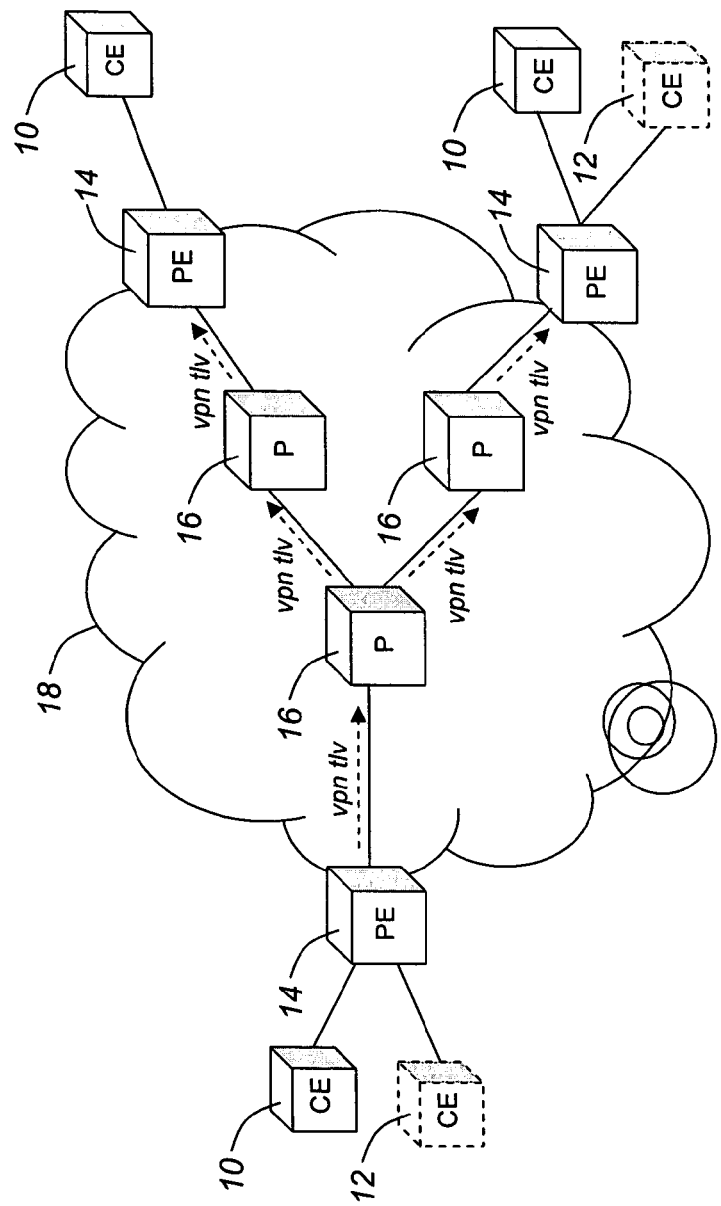
FIGS. 3-5 are schematic diagrams illustrating an IGP advertisement-based model for VPN services including two VPNs.
Figure 4:
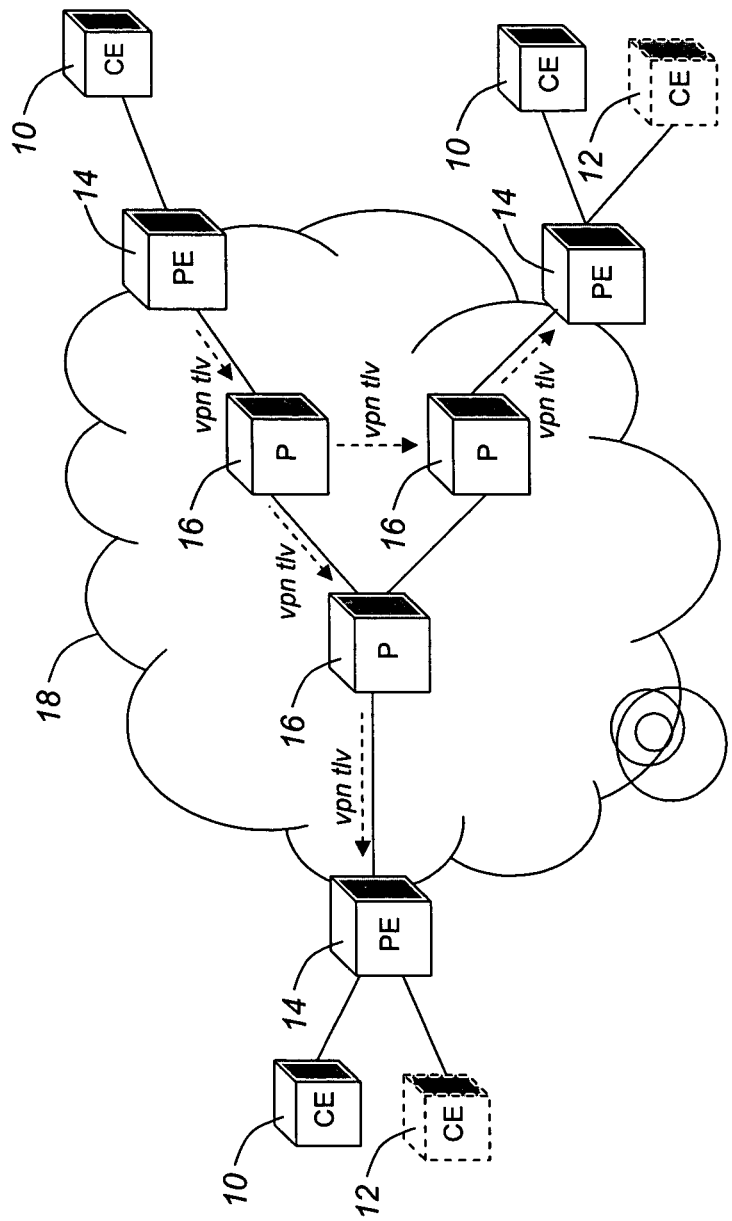
Figure 5:
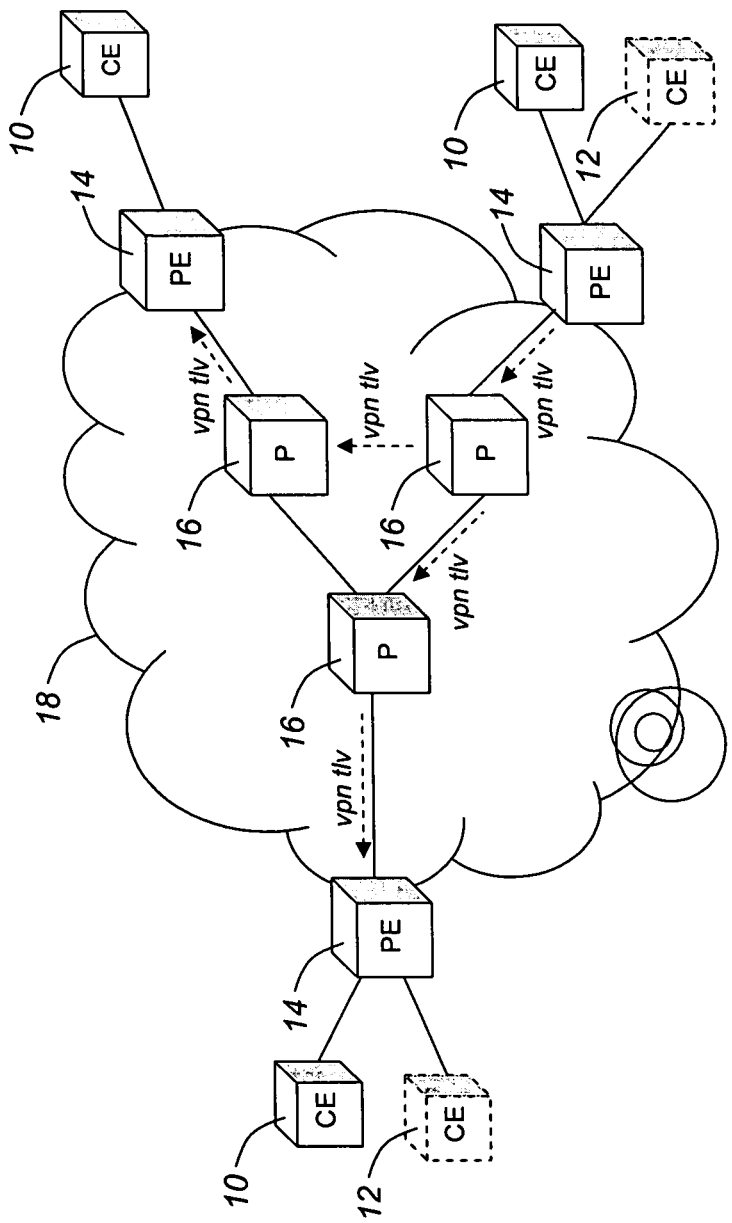

As described above, the present invention provides that the advertisement of VPN membership is done through source-independent distributed advertisements. Such advertisements may describe routing characteristics that are independent of the advertising node, i.e. characteristics of other nodes in the network. An example of using source-independent distributed advertisements for VPN is the use of extensions to the client reachability advertisement of the IGP routing protocol used in the domain. Client reachability advertisement, or TNA advertisement, is a relatively recent innovation that has been defined in the ITU-T ASON standards as a method of advertising reachability to a particular client or set of clients. The defined reachability advertisement includes only the client address or TNA and the node that supports reachability to the client. Advantageously, the reachability advertisement is extended to include other information relevant to VPN membership, such as a VPN ID associated with the client, client service class within the VPN, and whether the client is allowed to initiate or receive connections from outside of the VPN. By adding such information, VPN services are enabled in the network with a minimum of additional software upgrading and deployment.

As also described above, it should be noted that the source-independent distributed advertisements of the present invention may carry information about any node in the network and, as a result, allow for the advertisement of VPN membership by either the node locally hosting the VPN client or by other nodes, in particular, by a centralized source of advertisements, such as a centralized VPN management system. Because these advertisements carry both the advertisement source (i.e. the advertising router) and the identity of the node hosting the VPN client (i.e. the node ID) as separate pieces of information, the receiving system may use the advertised information without regard to which node generated the advertisement. This provides flexibility for the network operator to use the same mechanism to support either central administration of VPN membership (which may be advantageous for security and/or administrative simplicity) or distributed administration of VPN membership (which may be advantageous for client-based VPN management and/or situations where VPN membership changes rapidly).

As further described above, the present invention extends a simple existing mechanism for client reachability advertisement and provides a mechanism for offering sophisticated VPN services with minimal added complexity in the network control plane. No new routing protocols are required and no additional routing protocol traffic is generated beyond some additional information that must be carried in an existing client reachability advertisement.

In accordance with the present invention, the basic IGP mechanism is used to distribute VPN-related information. The present invention also takes advantage of the existing requirement in ASON networks that they advertise client reachability. In ASON networks, each node must advertise reachability to all supported client devices (see G.7715.1, for example) using a client reachability advertisement, such as the TNA Reachability Typed Length Value (TLV) in the Optical Internetworking Forum (OIF) routing protocol (see OIF 2005.313.04, for example). The TLV advertises reconnect time, recovery time, and fault tolerance (FT) flags to a node's peers. Because this client reachability advertisement is already required within ASON networks, and is already supported within Generalized Multiprotocol Label Switching (GMPLS) networks, it provides a convenient mechanism for advertising VPN information without requiring the use of BGP sessions, as described above, or the creation and generation of new IGP advertisements (as also described above).

Figure 6:
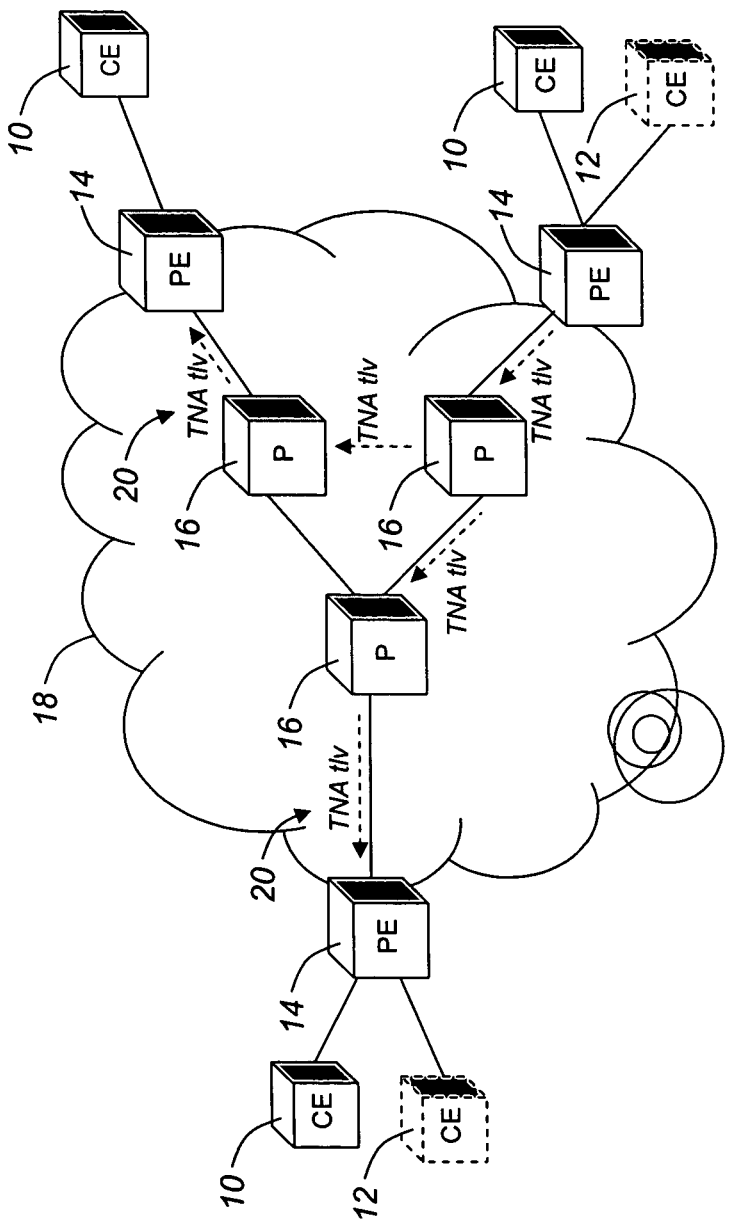
FIG. 6 is a schematic diagram illustrating the distribution of an advertisement of client reachability (i.e. a source-independent distributed advertisement) in accordance with the systems and methods of the present invention.

Referring to FIG. 6, the distribution of an advertisement of client reachability (i.e. a source-independent distributed advertisement) in accordance with the systems and methods of the present invention is illustrated. Specifically, the TNA TLV client reachability advertisement 20 associated with a given PE node 14 in the network 18 is sent to adjacent P nodes 16 and, subsequently, PE nodes 14. Again, the TNA TLV client reachability advertisement 20 advertises reconnect time, recovery time, FT flags, etc. associated with the sending PE node 14 to the adjacent P nodes 16 and PE nodes 14. Conventionally, such TNA TLV client reachability advertisements consist of a PE ID coupled with a list of one or more client addresses or address prefixes reachable at the sending PE node 14. The use of BGP sessions or the like is not necessary. In other words, a the PE node 14 creates an IGP advertisement containing its Node ID and a set of TNA addresses for attached client devices (CE) 10,12 in a TNA TLV client reachability advertisement. As part of the overall IGP message structure, this also includes the address of the PE node 14 as the advertising router, plus an identifier for the advertisement, and a lifetime representing the time during which the advertisement should be considered valid. The PE node 14 then sends copies of the advertisement to all of its adjacent neighbor nodes. Each receiving node (P 16 or PE 14) then compares the advertisement (including the source and the advertisement identifier) with any previously received advertisements to determine if the advertisement is a new one or was previously received from another node. If new, then the receiving node stores the information and sends out new copies to all of its adjacent neighbor nodes. When the advertisement is received at another PE node 14, it processes the advertisement and stores the received TNA information accordingly, but does not send out copies on any client interfaces. When the PE node 14 subsequently receives a request for connection from one of its locally attached clients (CE) to one of the advertised TNAs, it then computes a path to the remote PE node 14 supporting the destination TNA and uses this to create a connection to the destination client.

Figure 7:
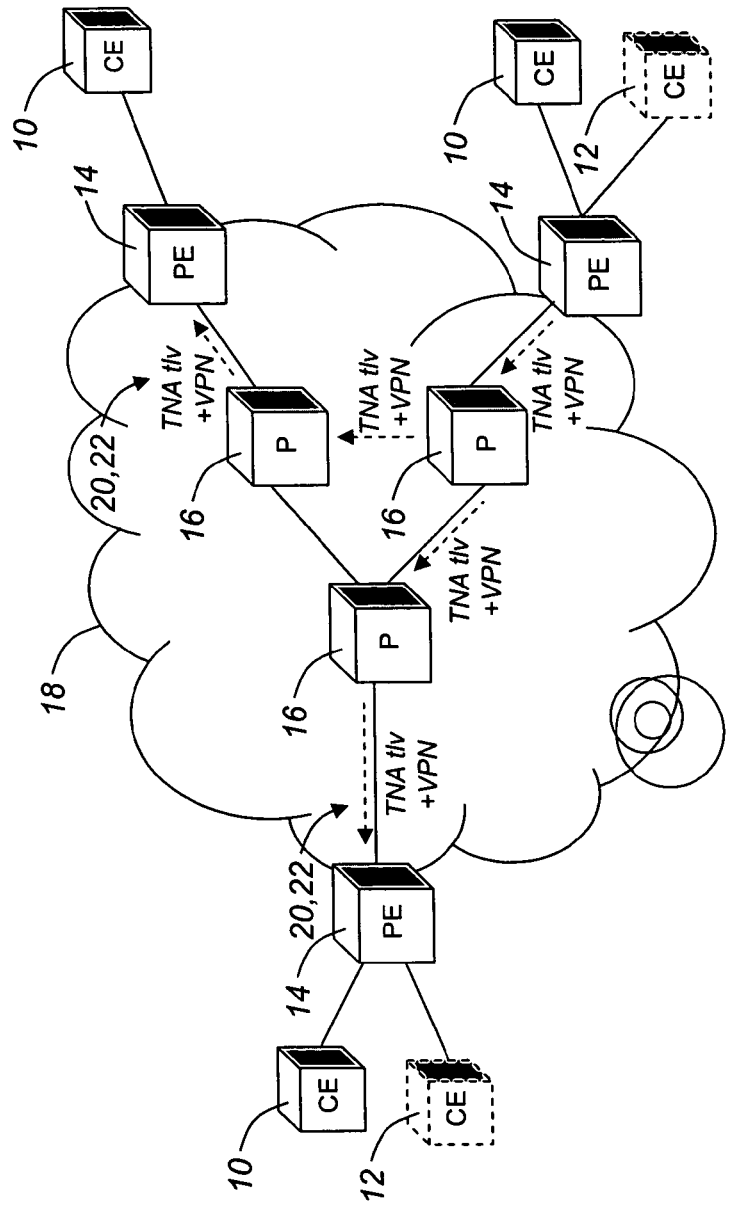
FIG. 7 is a schematic diagram illustrating the distribution of an advertisement of client reachability (i.e. a source-independent distributed advertisement) and VPN-related information in accordance with the systems and methods of the present invention.

Referring to FIG. 7, the distribution of an advertisement of client reachability (i.e. a source-independent distributed advertisement) and VPN-related information in accordance with the systems and methods of the present invention is illustrated. Specifically, the TNA TLV client reachability advertisement 20 associated with a given PE node 14 in the network 18 is sent to adjacent P nodes 16 and, subsequently, PE nodes 14. Again, the TNA TLV client reachability advertisement 20 advertises reconnect time, recovery time, FT flags, etc. associated with the sending PE node 14 to the adjacent P nodes 16 and PE nodes 14. Conventionally, such TNA TLV client reachability advertisements consist of a PE ID coupled with a list of one or more client addresses or address prefixes reachable at the sending PE node 14. In addition, the TNA TLV client reachability advertisements now also consist of one or more VPN IDs associated with a particular client address and other VPN-related information that may pertain to the client address, such as type or color/administrative group that the client has access to, other VPNs that the client is allowed to access, restrictions on the client (such as incoming/outgoing data only), restrictions on time of access, and characteristics allowed for client requests (such as priority). Because the advertisement is client address specific, it may carry information about multiple VPNs, and advertise information that pertains solely to the client, such as priority and authorization associated with the client. Again, the use of BGP sessions or the like is not necessary. In other words, the procedures here are the same as those described above except that, in this case, the client device (CE) 10,12 requests a connection to a VPN (CE) address, and the local PE node 14 then uses the stored information about the remote client to determine if the connection is allowed and what kind of priority or resources to use for the connection. An alternative mechanism contemplated by the present invention is the use of a central system as the source of the VPN advertisements, rather than the PE node 14 that hosts the client, as described below.

Figure 8:
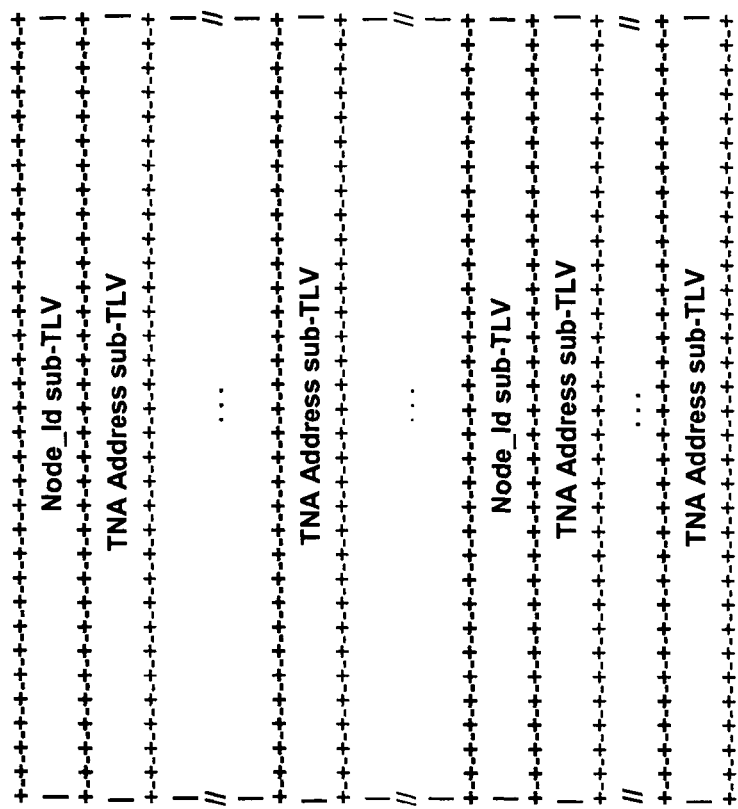
FIG. 8 is a schematic diagram illustrating one exemplary embodiment of the basic source-independent distributed advertisement of the present invention.

Referring to FIG. 8, the basic source-independent distributed advertisement 30 of the present invention includes a PE ID (Node_ID sub-TLV) coupled with a list of one or more client addresses or address prefixes reachable at a sending PE node 14 (FIG. 6) (TNA Address sub-TLV) (see OIF 2005.313.04, for example). This basic client reachability advertisement 30 is for use in an Open Shortest Path First (OSPF) routing protocol or any other routing protocol supporting client reachability advertisement. Similar extensions are being developed for the Intermediate System to Intermediate System (IS-IS) routing protocol and for GMPLS, for example. The type of information carried by the basic client reachability advertisement 30 is not limited to the fields illustrated.

Figure 9:
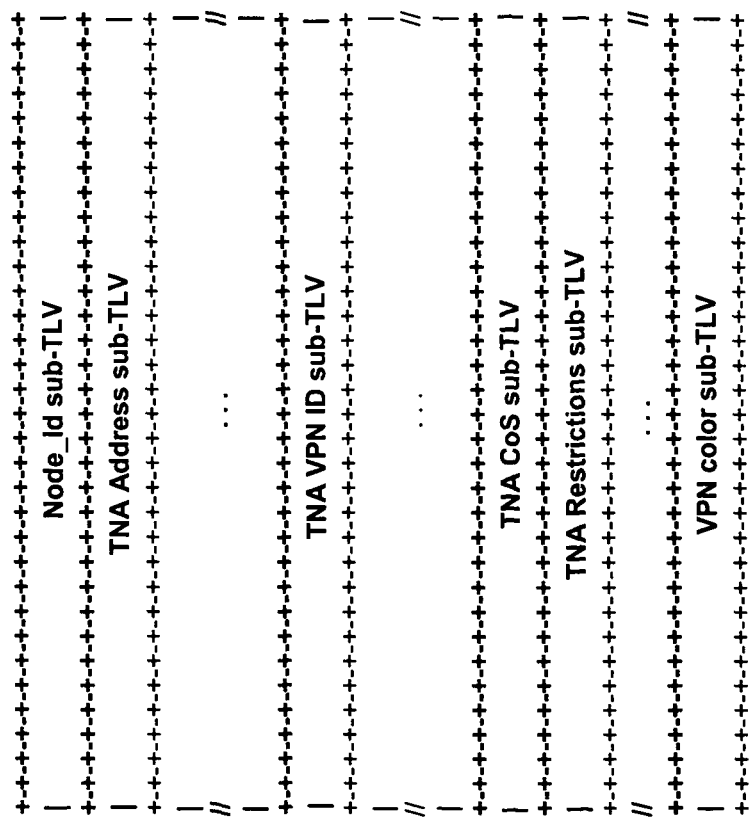
FIG. 9 is a schematic diagram illustrating one exemplary embodiment of the VPN source-independent distributed advertisement of the present invention.

Referring to FIG. 9, the VPN source-independent distributed advertisement 32 of the present invention again includes a PE ID (Node_ID sub-TLV) coupled with a list of one or more client addresses or address prefixes reachable at a sending PE node 14 (FIG. 7) (TNA Address sub-TLV) (see OIF 2005.313.04, for example). The VPN client reachability advertisement 32 also includes one or more VPN IDs associated with a particular client address (TNA VPN ID sub-TLV) and other VPN-related information that may pertain to the client address, such as type or color/administrative group that the client has access to (VPN color sub-TLV), other VPNs that the client is allowed to access (TNA CoS sub-TLV), restrictions on the client (such as incoming/outgoing data only) (TNA Restrictions sub-TLV), restrictions on time of access (TNA Restrictions sub-TLV), and characteristics allowed for client requests (such as priority) (TNA CoS sub-TLV). This VPN client reachability advertisement 32 is for use in an Open Shortest Path First (OSPF) routing protocol or any other routing protocol supporting client reachability advertisement. Similar extensions are being developed for the Intermediate System to Intermediate System (IS-IS) routing protocol and for GMPLS, for example. The type of VPN information carried by the VPN client reachability advertisement 32 is not limited to the fields illustrated.

The type or color/administrative group that the client has access to (VPN color sub-TLV) is advertised in order to link a particular VPN with the use of a subset of provider network resources that have been marked with a particular administrative group number or "color." This provides a relatively simple mechanism for allocating provider network resources to a particular VPN, implementing the sharing of provider network resources. Once a VPN has been marked to use a particular color, any subsequent connection requests or data exchange requests from the CE are mapped to provider network resources marked by the corresponding color, keeping these requests isolated from other provider network resources used by other VPNs or the general public. Because the advertisements are client-specific, provider network resources may also be allocated on a per-client basis, as well as a per-VPN basis. This may be extended to groups of clients by advertising multiple client addresses/TNAs or TNA prefixes.

A client or group of clients may be advertised with association to not only one VPN, but other VPNs as well if the client or group of clients belong to multiple VPNs. This is achieved by advertising VPN IDs associated with the client or group of clients.

A client or group of clients may also be associated with a particular Class of Service (CoS), such as priority of access to resources, protection or restoration capabilities, etc. This is supported by the inclusion of a CoS marking in the advertisement.

A client or group of clients may further have associated restrictions, such as access to resources based on time of day, a limitation to incoming/outgoing traffic only, etc. This is supported by the inclusion of a client restriction marking in the advertisement.

Figure 10:
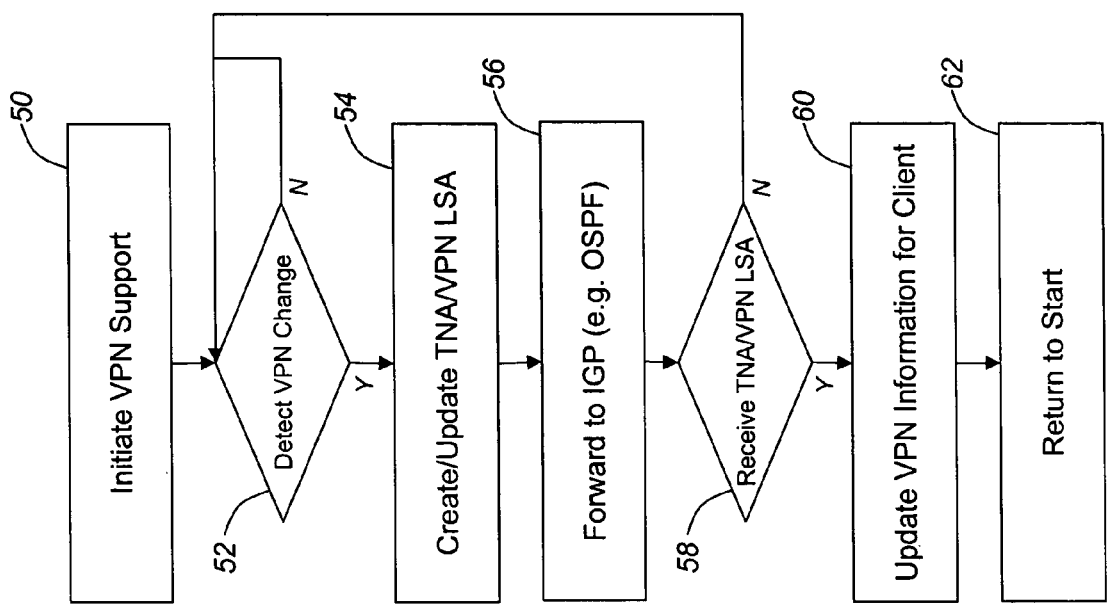
FIG. 10 is a flowchart illustrating one exemplary embodiment of the VPN source-independent distributed advertisement methodology of the present invention.

Referring to FIG. 10, the VPN source-independent distributed advertisement methodology of the present invention includes, after VPN support is initiated (Block 50) and a VPN change is detected (Block 52), creating or updating a client reachability advertisement (Block 54). This client reachability advertisement is forwarded to and by the applicable routing protocol (Block 56) and subsequently received at the various nodes of the network (Block 58) where the VPN information for that particular client or group of clients is updated (Block 60). This process is subsequently repeated (Block 62).

As described above, the present invention provides for the distributed administration of VPN membership, with a network node locally hosting a VPN client (a PE node 14) and advertising membership of the client in the VPN using a distributed routing protocol via the client reachability advertisement, for example. The central administration of VPN membership is also contemplated, however.

Figure 11:
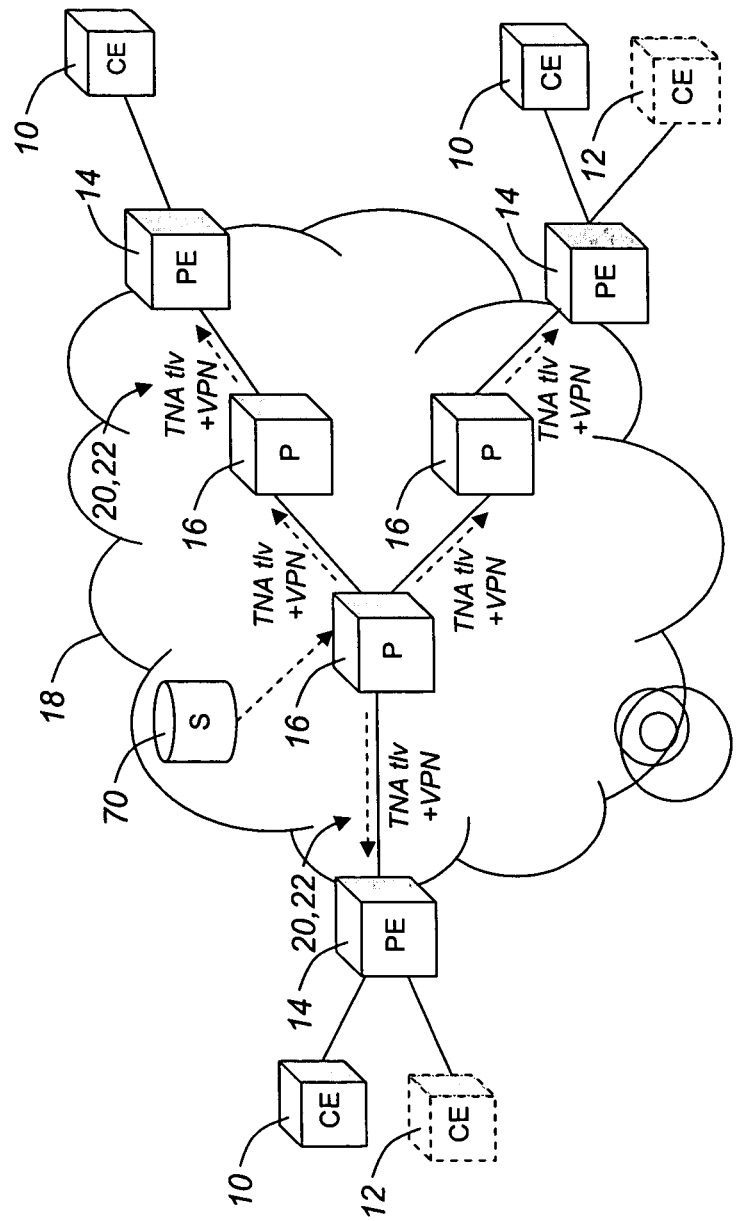
FIG. 11 is a schematic diagram illustrating an alternative embodiment of the flexible mechanism for supporting VPN services based on source-independent distributed advertisements of the present invention, the alternative embodiment allowing for the central administration of VPN membership, as opposed to the distributed administration of VPN membership.

FIG. 11 is a schematic diagram illustrating an alternative embodiment of the flexible mechanism for supporting VPN services based on source-independent distributed advertisements of the present invention, the alternative embodiment allowing for the central administration of VPN membership, as opposed to the distributed administration of VPN membership. A key characteristic of the client reachability advertisement, and other similar mechanisms, is that they are source-independent, that is, by their very structure they separately identify the node generating the advertisement and the node hosting the TNA or VPN client. Thus, rather than having the PE node 14 generate the VPN membership advertisement, one or more central management systems (S) 70 may generate the VPN membership advertisement. The advertisement is sourced from the central management system(s) 70, but each receiving PE node 14 processes the advertisement exactly as if it was received from a remote PE node 14 hosting a VPN client (CE) 10,12. This is possible because the advertisement includes both the identity of the advertising system, in this case the central management system(s) 70, (i.e. the advertising router), as well as the identity of the PE node 14 hosting the advertised VPN client (i.e. the Node ID). The adds flexibility to the mechanism for cases in which, for example, greater authentication, authorization, and administration functions are required than are supported by the PE node 14 locally, or global changes are made to VPN membership that are preferably propagated to all of the PE nodes 14 at the same time.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for distributing client Virtual Private Network (VPN)-related information within a network using a source-independent distributed advertisement, comprising:
    operating the network without utilizing Border Gateway Protocol (BGP);
    incorporating the client VPN-related information related to a node of the network into the source-independent distributed advertisement associated with an Automatically Switched Optical Network (ASON) or Generalized Multiprotocol Label Switching (GMPLS) routing protocol in lieu of using BGP therefor, wherein the source-independent distributed advertisement comprises a client reachability advertisement with a client address and information relevant to VPN membership;
    distributing the source-independent distributed advertisement from one of the node of the network, another node of the network, and a central management system to at least one other node of the network using Type-Length-Value (TLV) fields in existing messages of the ASON or GMPLS routing protocol without generating additional routing protocol traffic comprising creation and generation of Interior Gateway Protocol (IGP) advertisements for advertisements related to the VPN membership, wherein the source-independent distributed advertisement is not sent to a client interface; and
    updating other VPN-related information with the client VPN-related information related to the node of the network at the at least one other node of the network;
    wherein the source-independent distributed advertisement comprises the client reachability advertisement comprising a Transport Network-Assigned Address (TNA) advertisement.

2. The method of claim 1, wherein the client VPN-related information related to the node of the network comprises one or more of a node identification, one or more client addresses reachable at the node of the network, and one or more client address prefixes reachable at the node of the network.

3. The method of claim 1, wherein the client VPN-related information related to the node of the network comprises one or more VPN identifications associated with one or more client addresses, a type or administrative group/color that one or more clients have access to, one or more VPNs that the one or more clients are allowed to access, one or more restrictions on the one or more clients, one or more classes of service for the one or more clients, and one or more characteristics allowed for requests of the one or more clients.

4. The method of claim 1, wherein the node of the network comprises one of Client Edge (CE) equipment and Provider Edge (PE) equipment.

5. The method of claim 1, wherein the other nodes of the network comprise one or more of Provider Edge (PE) equipment and Provider (P) equipment.

6. The method of claim 1, wherein the client reachability advertisement comprises a TNA Typed Length Value (TLV) advertisement.

7. The method of claim 1, wherein updating the other VPN-related information with the client VPN-related information related to the node of the network at the at least one other node of the network comprises updating one or more tables at the at least one other node of the network.

8. The method of claim 1, wherein the client VPN-related information related to the node of the network is distributed to the at least one other node of the network without requiring the establishment of a Transmission Control Protocol (TCP) session specifically for the distribution of the client VPN-related information.

9. The method of claim 1, wherein a basic Interior Gateway Protocol (IGP) mechanism is used to distribute VPN-related information over already existing ASON advertisements.

10. The method of claim 1, wherein the Transport Network-Assigned Address (TNA) advertisement is compliant to OIF 2005.313.04.

11. The method of claim 1, wherein the Transport Network-Assigned Address (TNA) advertisement comprises advertisements for reachability to a particular client or set of clients and advertisements relevant to the VPN membership.

12. A system for distributing client Virtual Private Network (VPN)-related information within a network using a source-independent distributed advertisement, comprising:
    a first processor at one of a node of the network, another node of the network, and a central management system operable for incorporating the client VPN-related information related to the node of the network into the source-independent distributed advertisement associated with an Automatically Switched Optical Network (ASON) or Generalized Multiprotocol Label Switching (GMPLS) routing protocol, wherein the source-independent distributed advertisement comprises a client reachability advertisement with a client address and information relevant to VPN membership in lieu of using Border Gateway Protocol (BGP) therefor;
    a network connection for distributing the source-independent distributed advertisement from one of the node of the network, the another node of the network, and the central management system to at least one other node of the network using Type-Length-Value (TLV) fields in existing messages of the ASON or GMPLS routing protocol without generating additional routing protocol traffic comprising creation and generation of Interior Gateway Protocol (IGP) advertisements, wherein the source-independent distributed advertisement is not sent to a client interface; and
    a processor at the at least one other node of the network for updating other VPN-related information with the client VPN-related information related to the node of the network at the at least one other node of the network;
    wherein the network does not utilize Border Gateway Protocol (BGP); and wherein the source-independent distributed advertisement comprises the client reachability advertisement comprising a Transport Network-Assigned Address (TNA) advertisement.

13. The system of claim 12, wherein the client VPN-related information related to the node of the network comprises one or more of a node identification, one or more client addresses reachable at the node of the network, and one or more client address prefixes reachable at the node of the network.

14. The system of claim 12, wherein the client VPN-related information related to the node of the network comprises one or more VPN identifications associated with one or more client addresses, a type or administrative group/color that one or more clients have access to, one or more VPNs that the one or more clients are allowed to access, one or more restrictions on the one or more clients, one or more classes of service for the one or more clients, and one or more characteristics allowed for requests of the one or more clients.

15. The system of claim 12, wherein the node of the network comprises one of Client Edge (CE) equipment and Provider Edge (PE) equipment.

16. The system of claim 12, wherein the other nodes of the network comprise one or more of Provider Edge (PE) equipment and Provider (P) equipment.

17. The system of claim 12, wherein the client reachability advertisement comprises a TNA Typed Length Value (TLV) advertisement.

18. The system of claim 12, wherein the processor at the at least one other node of the network for updating the other VPN-related information with the client VPN-related information related to the node of the network at the at least one other node of the network comprises a processor at the at least one other node of the network for updating one or more tables at the at least one other node of the network.

19. A method for distributing client Virtual Private Network (VPN)-related information within a network using a source-independent distributed advertisement, comprising:
   operating the network without utilizing Border Gateway Protocol (BGP);
   incorporating the client VPN-related information related to a node of the network into the source-independent distributed advertisement associated with an Automatically Switched Optical Network (ASON) or Generalized Multiprotocol Label Switching (GMPLS) routing protocol in lieu of using BGP therefor, wherein the source-independent distributed advertisement comprises a client reachability advertisement with a client address and information relevant to VPN membership;
   distributing the source-independent distributed advertisement from one of the node of the network, another node of the network, and a central management system to at least one other node of the network using Type-Length-Value (TLV) fields in existing messages of the ASON or GMPLS routing protocol without generating additional routing protocol traffic comprising creation and generation of Interior Gateway Protocol (IGP) advertisements, wherein the source-independent distributed advertisement is not sent to a client interface; and
   updating other VPN-related information with the client VPN-related information related to the node of the network at the at least one other node of the network, wherein updating the other VPN-related information with the client VPN-related information related to the node of the network at the at least one other node of the network comprises updating one or more tables at the at least one other node of the network;
   wherein the client VPN-related information related to the node of the network is distributed to the at least one other node of the network without requiring the establishment of a Transmission Control Protocol (TCP) session specifically for the distribution of the client VPN-related information; and
   wherein the client VPN-related information related to the node of the network is contained within a Transport Network-Assigned Address (TNA) advertisement and comprises, within the TNA advertisement, one or more of a node identification, one or more client addresses reachable at the node of the network, and one or more client address prefixes reachable at the node of the network.

20. The method of claim 19, wherein the client VPN-related information related to the node of the network is contained within a Transport Network-Assigned Address (TNA) advertisement and comprises, within the TNA advertisement, one or more VPN identifications associated with one or more client addresses, a type or administrative group/color that one or more clients have access to, one or more VPNs that the one or more clients are allowed to access, one or more restrictions on the one or more clients, one or more classes of service for the one or more clients, and one or more characteristics allowed for requests of the one or more clients.

* * * * *